United States Patent
Aggarwal et al.

(10) Patent No.: US 8,650,213 B2
(45) Date of Patent: Feb. 11, 2014

(54) SYSTEM AND METHOD FOR DISTRIBUTED PRIVACY PRESERVING DATA MINING

(75) Inventors: Charu C. Aggarwal, Mohegan Lake, NY (US); Philip Shi-Lung Yu, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 1376 days.

(21) Appl. No.: 11/752,708

(22) Filed: May 23, 2007

(65) Prior Publication Data
US 2010/0268734 A1 Oct. 21, 2010

Related U.S. Application Data

(63) Continuation of application No. 10/892,691, filed on Jul. 16, 2004, now Pat. No. 7,305,378.

(51) Int. Cl.
*G06F 7/00* (2006.01)

(52) U.S. Cl.
USPC ................................ 707/776; 705/51; 705/65

(58) Field of Classification Search
USPC ...................................... 705/51, 65; 707/776
See application file for complete search history.

(56) References Cited

U.S. PATENT DOCUMENTS

| | | | |
|---|---|---|---|
| 5,758,147 A | 5/1998 | Chen et al. | |
| 6,084,966 A * | 7/2000 | Maebara et al. | 380/43 |
| 6,278,998 B1 | 8/2001 | Ozden et al. | |
| 6,628,786 B1 * | 9/2003 | Dole | 380/44 |
| 2003/0028327 A1 | 2/2003 | Brunner et al. | |
| 2004/0139025 A1 * | 7/2004 | Coleman | 705/51 |
| 2005/0055316 A1 * | 3/2005 | Williams | 705/65 |

OTHER PUBLICATIONS

Privacy Preserving Frequent Itemset Mining http://www.cs.ualberta.ca/~zaiane/postscript/PSDMO2-2.pdf Stanley Oliveira, Osmar Zaiane Sep. 16, 2003.*
Vassilios S. Verykios, State-of-the-art in Privacy Preserving Data Mining, Mar. 2004, SIGMOD Record, vol. 33, No. 1, pp. 50-57.*
R. Aggarwal et al., "Privacy-Preserving Data Mining," Proceedings of the ACM SIGMOD Conference, pp. 12 pages, 2000.
D. Agrawal et al., "On the Design and Quantification of Privacy Preserving Data Mining Algorithms," ACM PODS Conference, 9 pages, 2002.
Paola Benassi, "TRUSTe: An Online Privacy Seal Program," Communications of the ACM, vol. 42, No. 2, pp. 56-59, Feb. 1999.

(Continued)

*Primary Examiner* — Pierre Vital
*Assistant Examiner* — Christopher J Raab
(74) *Attorney, Agent, or Firm* — William Stock; Ryan, Mason & Lewis, LLP

(57) ABSTRACT

Distributed privacy preserving data mining techniques are provided. A first entity of a plurality of entities in a distributed computing environment exchanges summary information with a second entity of the plurality of entities via a privacy-preserving data sharing protocol such that the privacy of the summary information is preserved, the summary information associated with an entity relating to data stored at the entity. The first entity may then mine data based on at least the summary information obtained from the second entity via the privacy-preserving data sharing protocol. The first entity may obtain, from the second entity via the privacy-preserving data sharing protocol, information relating to the number of transactions in which a particular itemset occurs and/or information relating to the number of transactions in which a particular rule is satisfied.

17 Claims, 5 Drawing Sheets

(56) References Cited

OTHER PUBLICATIONS

C. Clifton et al., "Security and Privacy Implications of Data Mining," Proceedings of the ACM SIGMOD Workshop on Data Mining and Knowledge Discovery, 5 pages, 1996.

C. Clifton et al., "Defining Privacy for Data Mining," National Science Foundation Workshop on Next Generation Data Mining, pp. 126-133, 2002.

J. Vaidya et al., "Privacy Preserving Association Rule Mining in Vertically Partitioned Data," ACM KDD Conference, 6 pages, 2002.

V. Estivill-Castro et al., "Data Swapping: Balancing Privacy Against Precision in Mining for Logic Rules," Lecture Notes in Computer Science, vol. 1676, Springer-Verlag, pp. 389-398, 1999.

A. Evfimievski et al., "Privacy Preserving Mining of Association Rules," ACM KDD Conference, 12 pages, 2002.

A. Hinneburg et al., "An Efficient Approach to Clustering in Large Multimedia Databases with Noise," ACM KDD Conference, 8 pages, 1998.

Vijay S. Iyengar, "Transforming Data to Satisfy Privacy Constraints," ACM KDD Conference, pp. 279-288, 2002.

C.K. Liew et al., "A Data Distortion by Probability Distribution," ACM Transactions on Database Systems Journal, vol. 10, No. 3, pp. 395-411, Sep. 1985.

T. Lau et al., "Privacy Interfaces for Information Management," Communications of the ACM, vol. 42, No. 10, pp. 89-94, Oct. 1999.

Sreerama K. Murthy, "Automatic Construction of Decision Trees from Data: A Multi-Disciplinary Survey," Kluwer Academic Publishers, pp. 1-49, 1998.

R.A. Moore, Jr., "Controlled Data-Swapping Techniques for Masking Public Use Microdata Sets," Statistical Research Division Report Series, RR 96-04, U.S. Bureau of the Census, 40 pages, 1996.

S.J. Rizvi et al., "Maintaining Data Privacy in Association Rule Mining," VLDB Conference, 12 pages, 2002.

P. Samarati et al., "Protecting Privacy when Disclosing Information: $k$-Anonymity and its Enforcement through Generalization and Suppression," Proceedings of the IEEE Symposium on Research in Security and Privacy, pp. 1-19, 1998.

\* cited by examiner

SYSTEM AND METHOD FOR DISTRIBUTED PRIVACY PRESERVING DATA MINING

CROSS-REFERENCE TO RELATED APPLICATION(S)

This application is a continuation of U.S. application Ser. No. 10/892,691, filed on Jul. 16, 2004 now U.S. Pat. No. 7,305,378, the disclosure of which is incorporated by reference herein.

STATEMENT REGARDING FEDERALLY SPONSORED RESEARCH OR DEVELOPMENT

This invention was made with Government support under Contract No.: H98230-04-3-0001 awarded by the Department of Defense. The Government has certain rights in this invention.

FIELD OF THE INVENTION

The present invention relates to privacy preserving data mining techniques and, more particularly, to distributed privacy preserving data mining techniques.

BACKGROUND OF THE INVENTION

Privacy preserving data mining has become an important issue in recent years due to the large amount of consumer data tracked by automated systems on the Internet. The proliferation of electronic commerce on the World Wide Web has resulted in the storage of large amounts of transactional and personal information about users. In addition, advances in hardware technology have also made it feasible to track information about individuals from transactions in everyday life.

For example, a simple transaction such as using a credit card results in automated storage of information about user buying behavior. In many cases, users are not willing to supply such personal data unless its privacy is guaranteed. Therefore, in order to ensure effective data collection, it is important to design methods which can mine the data with a guarantee of privacy. This has resulted in a considerable amount of focus on privacy preserving data collection and mining methods in recent years.

Privacy preserving data mining approaches may essentially be considered one of two types: (1) privacy determination using a single server; and (2) distributed privacy preserving data mining.

(1) Privacy Determination Using a Single Server.

In this approach, users are not willing to share their data with the server which stores their data. A recent approach to privacy preserving data mining of this kind of data has been a perturbation-based technique. Users are not equally protective of all values in the records. Thus, users may be willing to provide modified values of certain fields by the use of a (publicly known) perturbing random distribution. This modified value may be generated using custom code or a browser plug-in. Data mining problems do not necessarily require the individual records, but only distributions. Since the perturbing distribution is known, it can be used to reconstruct aggregate distributions. This aggregate information may be used for the purpose of data mining algorithms.

It is to be noted that the perturbation approach results in some amount of information loss. The greater the level of perturbation, the less likely it is that the data distributions are estimated effectively. On the other hand, larger perturbations also lead to a greater amount of privacy. Thus, there is a natural trade-off between greater accuracy and loss of privacy.

(2) Distributed Privacy Preserving Data Mining.

In this kind of privacy preservation, the users are willing to share the records with their individual servers, but not with other servers. In many cases, it may be desirable to find a way to mine the aggregate data across the different servers. An example of such a case is the situation in which different competing businesses do not wish to share their competitive data, but they do wish to cooperate to the extent that aggregate data across different servers is shared. This situation can often arise in a retail environment in which different competing entities may desire to find aggregate information about market basket transactions. Unfortunately, existing techniques do not provide suitable ways to mine the aggregate data across the different servers.

Accordingly, it would be highly desirable to provide techniques for use in accordance with a distributed privacy preserving data mining approach.

SUMMARY OF THE INVENTION

The present invention provides techniques for use in accordance with a distributed privacy preserving data mining approach.

For example, in one aspect of the present invention, a technique for data mining in a privacy-preserving manner in a distributed computing environment including a plurality of entities, comprises the following steps/operations. A first entity of the plurality of entities exchanges summary information with a second entity of the plurality of entities via a privacy-preserving data sharing protocol such that the privacy of the summary information is preserved, the summary information associated with an entity relating to data stored at the entity. The first entity may then mine data based on at least the summary information obtained from the second entity via the privacy-preserving data sharing protocol.

The first entity may obtain, from the second entity via the privacy-preserving data sharing protocol, information relating to the number of transactions in which a particular itemset occurs. The first entity may obtain, from the second entity via the privacy-preserving data sharing protocol, information relating to the number of transactions in which a particular rule is satisfied.

Further, the summary information exchanging step/operation may further comprise the first entity adding a random number to a global count and transmitting the global count to the second entity. The first entity may subtract a random number from a global count and transmit the global count to the second entity.

Still further, the summary information exchanging step/operation may further comprise: the first entity transmitting a first random number to the second entity; the first entity receiving from the second entity a first result, the first result representing a summation of the first random number and a second random number associated with the second entity; the first entity transmitting a second result to the second entity, the second result representing a summation of the first result and summary information relating to data stored at the first entity; the first entity receiving a third result from the second entity, the third result representing a summation of the second result and summary information relating to data stored at the second entity; the first entity transmitting a fourth result to the second entity, the fourth result representing a subtraction of the first random number from the third result; and the first entity receiving a fifth result from the second entity, the fifth result representing a subtraction of the second random number from the fourth result.

In addition, the summary information exchanging step/operation may further comprise the first entity exchanging summary information with two or more of the plurality of entities and the first entity mining data based on the summary information obtained from the two or more entities. The summary information may relate to a limited subset of items. The first entity may define the limited subset of items for which summary information is to be exchanged. The first entity may determine participating entities for each itemset for which summary information is to be exchanged. The first entity may transmit summary information only to a participating entity for a particular itemset.

The inventive technique may further comprise the step/operation of the first entity discarding itemsets having a number of potential participants below a particular threshold value. Also, the first entity may generate one or more association rules from one or more itemsets.

Thus, in accordance with embodiments of the present invention, techniques are provided for distributed privacy preserving mining of data from multiple entities. Advantageously, data may be mined without revealing either individual or summary information among the different entities. The invention also provides techniques in which entities can selectively contribute information about different items.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary distributed data processing system architecture. It should be understood, however, that the invention is not limited to use with any particular distributed system architecture. The invention is instead more generally applicable to any distributed data processing system in which it is desirable to provide improved techniques for use in accordance with a distributed privacy preserving data mining approach. As used herein, the term "entity" generally refers to one or more computing devices or systems such as, for example, may be associated with a data repository or server. However, the term is not intended to be limited to any particular computing device or system.

As will be illustratively described herein, the invention provides techniques for distributed privacy preserving data mining. Examples of data that may be mined include, but are not limited to, itemsets and association rules. This includes methods for situations in which different servers may have different numbers of transactions or items. The invention provides a protocol for passing information among the different servers in such a way that the privacy of the data in individual servers is maintained. At the same time, the aggregate itemsets can be mined for use by any of the servers.

Figure 1:
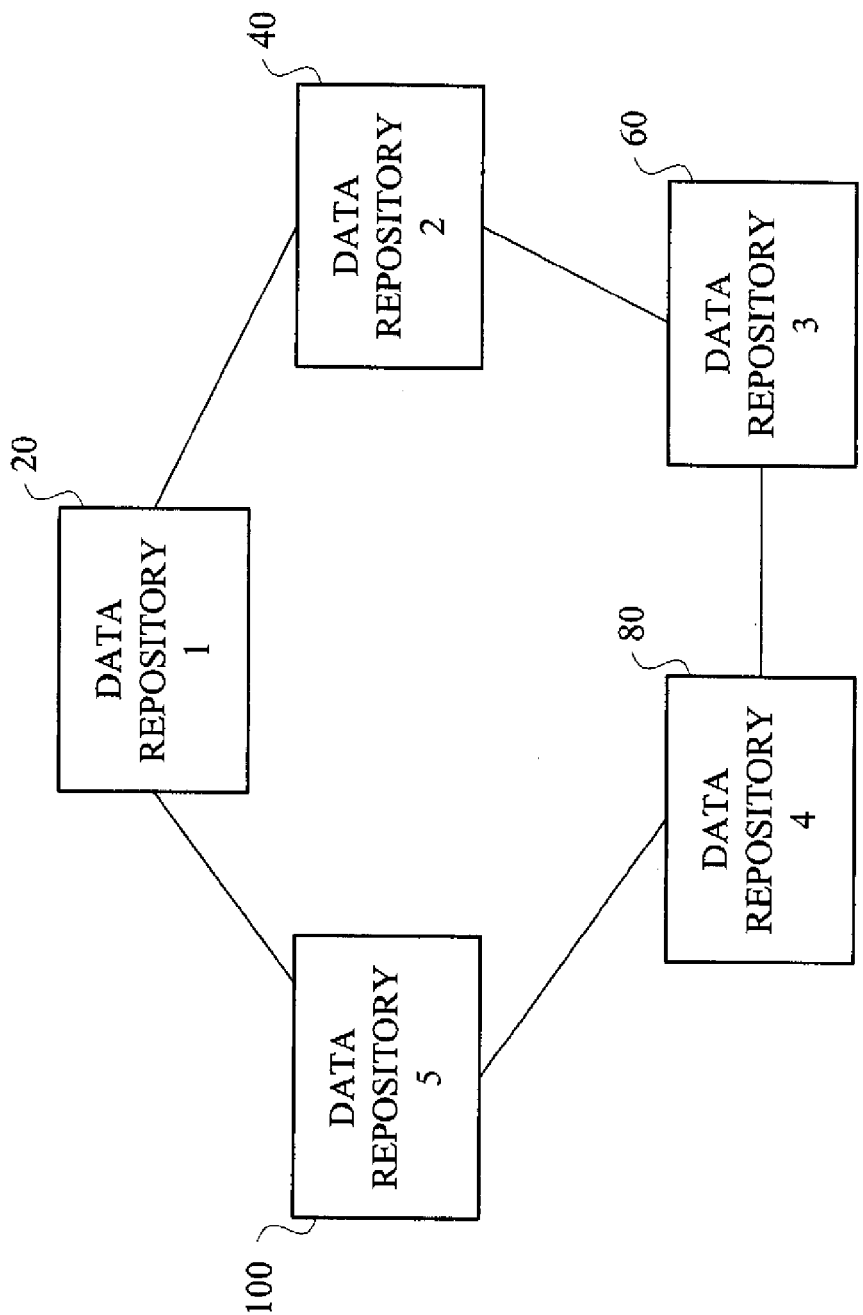
FIG. 1 is a block diagram illustrating a distributed environment wherein various entities interact with one another for the purpose of privacy preserving data mining, according to one embodiment of the present invention.

Referring initially to FIG. 1, a block diagram illustrates a distributed environment wherein various entities interact with one another for the purpose of privacy preserving data mining, according to one embodiment of the present invention. More particularly, FIG. 1 illustrates an overall setup for the invention. In the overall setup, a distributed procedure is used for the privacy preserving data mining technique. In this setup, a number of different data repositories are maintained which can share data among each other. The blocks 20, 40, 60, 80, and 100 represent the different data repositories. These data repositories may correspond to different businesses which may not wish to share their entire set of business information. At the same time, they may wish to collaborate to the extent that essential business information can be shared across multiple customers.

Figure 2:
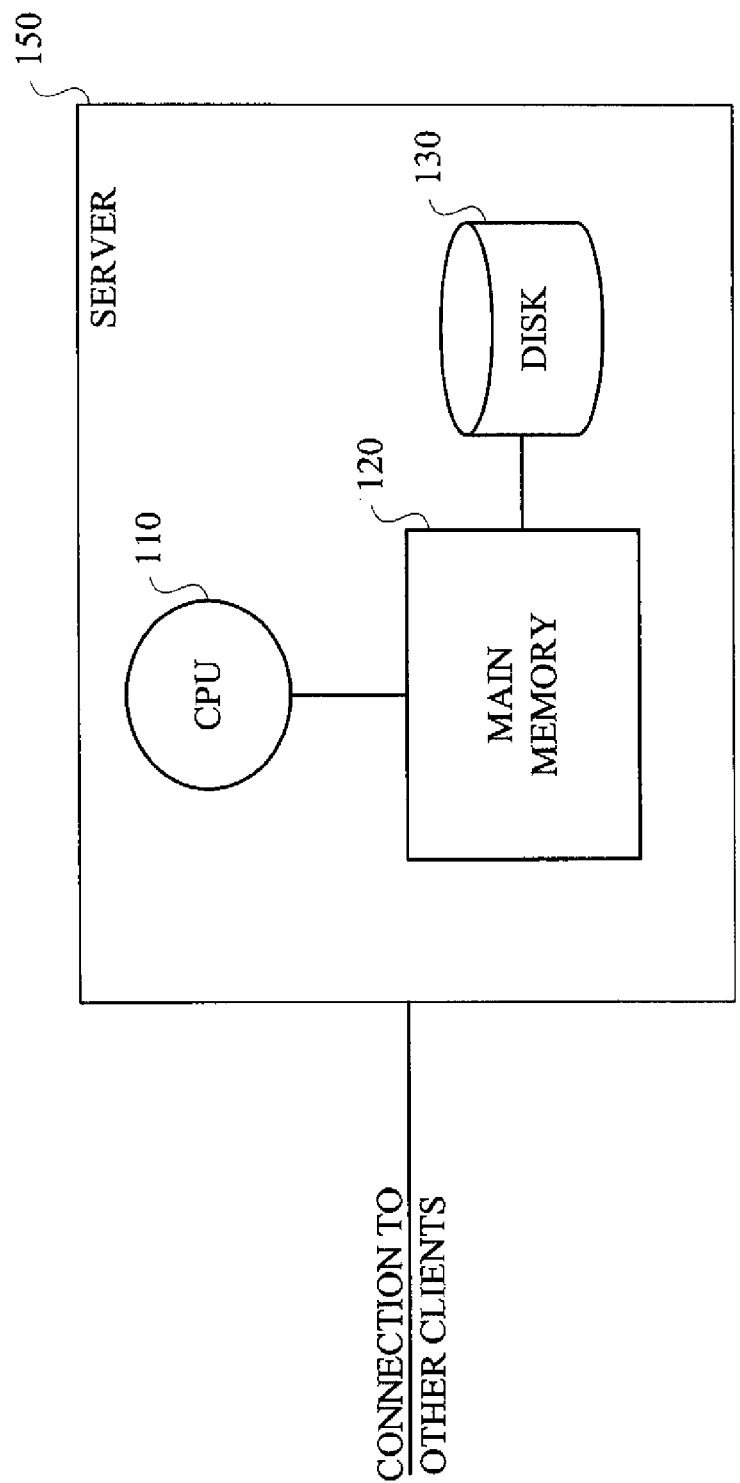
FIG. 2 is a block diagram illustrating an architecture for each of the interacting entities illustrated in FIG. 1, according to an embodiment of the present invention.

Referring now to FIG. 2, a block diagram illustrates an architecture for each of the interacting entities (i.e., data repositories) illustrated in FIG. 1, according to an embodiment of the present invention. That is, FIG. 1 illustrates an architecture at each customer end. Each of the entities contains a computing system in the form of a server 150 which is used for storing the data at its end. Each computing system may also include more than one server. This stored data is utilized for the purpose of data mining.

The server 150 contains a central processing unit (CPU) 110, main memory 120, and disk 130. Disk 130 contains the private information belonging to each entity. CPU 110 performs the methodologies of the invention, i.e., processing related to the data mining. Main memory 120 is used by CPU 110 to perform the methodologies.

Each entity (server 150) also contains a connection to other clients (e.g., other data repositories), as is depicted in FIG. 2. This connection to the other clients is used in order for the entities to exchange information with one another during the data mining process. It is to be appreciated that each entity in the distributed system may be coupled via a network (e.g., Internet, private network, a local area network, or some other suitable network).

Accordingly, in this illustrative embodiment, all or portions of the data mining operations of the present invention are executed in association with server 150. All or a portion of the results generated in association with the computer system may be presented on a display (not shown) to a system user, if so desired. Further, in one embodiment, software components including program instructions or code for performing the methodologies of the invention, as described herein, may be stored in one or more memory devices described above and, when ready to be utilized, loaded in part or in whole and executed by the CPU.

Figure 3:
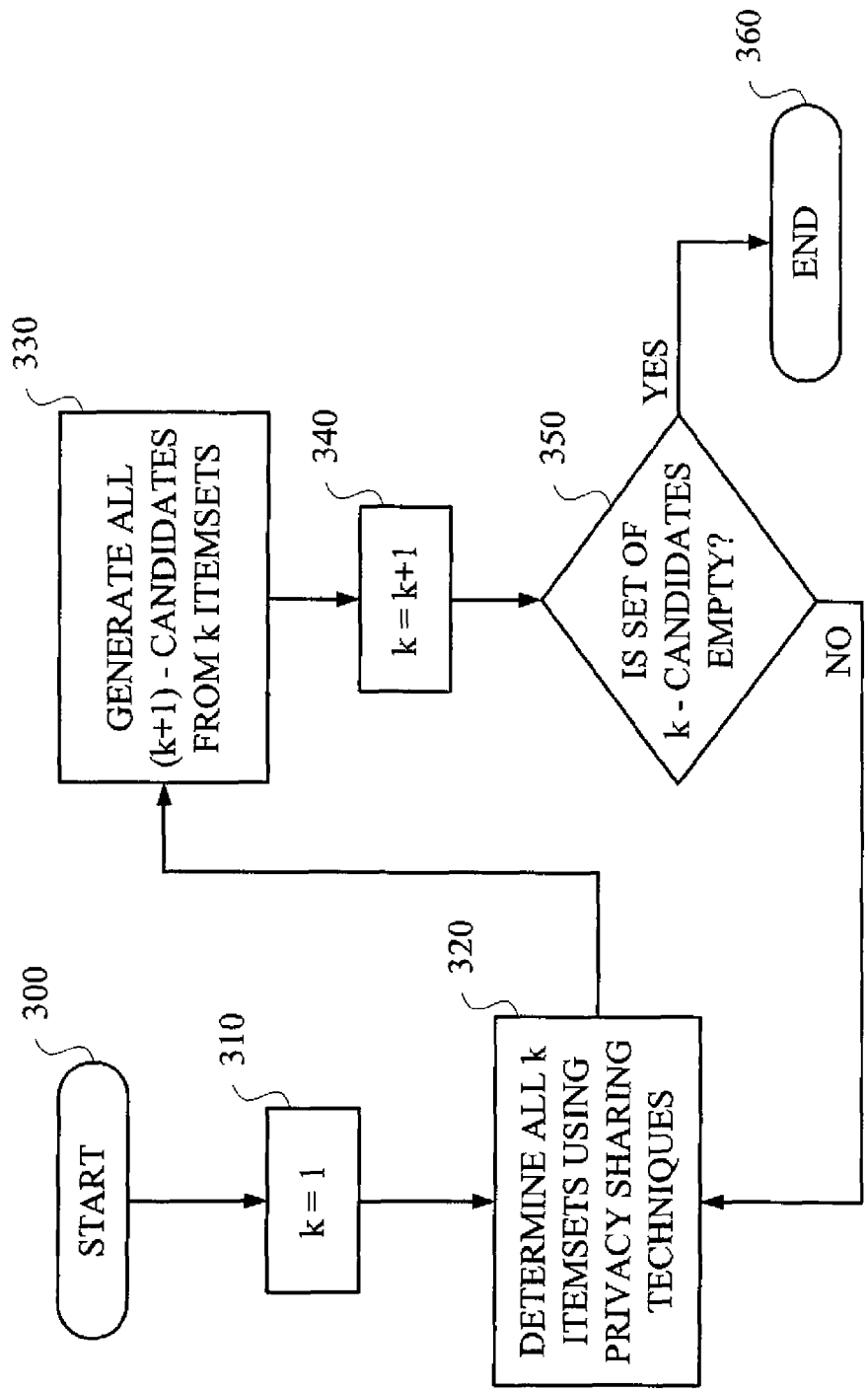
FIG. 3 is a flow diagram illustrating an overall data mining process with a protocol for performing information exchange during the data mining process, according to an embodiment of the present invention.

Referring now to FIG. 3, a flow diagram illustrates an overall data mining process with a protocol for performing information exchange (data sharing) during the data mining process, according to an embodiment of the present invention. It is to be understood that any one or more of the interacting entities (e.g., servers 150) in the distributed environment may perform the data mining process in accordance with the information exchange protocol of the invention. Alternatively, a computing system separate from any of the servers may perform the inventive process.

In accordance with an illustrative embodiment, we discuss the problem of itemset generation from transactional data belonging to different customers. However, the inventive technique can be easily extended to a host of other problems.

As an example, we will use the case of transactional data bought by customers in a superstore. The transactional data includes groups of items bought by different customers in a superstore. The problem illustrated here is that of finding large itemsets from these groups of customers. An itemset is defined to be a group of items which are bought together. For example, the set of items {Bread, Butter, Milk} could correspond to an itemset.

We define a k-itemset as a set which has at least k items therein. Typically, an itemset corresponds to a group of closely related items. For an itemset to be considered relevant by the data mining process (i.e., also referred to as a large itemset), it should be present in at least a certain fraction of the overall number of customers. This fraction is defined as the minimum support. We note that the data sets are divided over the different entities illustrated in FIG. 1. This makes the problem of computing the overall support values especially difficult. This is because each entity is not privy to the data available to other entities. Therefore, it is desirable to share the data in such a way that only aggregate statistics are shared among the different entities. At each stage, we do not wish to share the actual records, but only aggregate summary statistics about the supports of particular itemsets local to each group.

Even the aggregate summary statistics need to be masked appropriately, since in many cases entities may not be willing to provide such statistics for competitive reasons. Thus, the invention provides a protocol which is able to share the information among different entities while also maintaining the privacy of the summary characteristics of this group. In order to achieve this goal, a levelwise algorithm as illustrated in FIG. 3 is applied.

In the levelwise algorithm, the (k+1)-candidates are generated sequentially by utilizing successive joins on the k-itemsets. The process begins at block 300 and starts off by setting k to 1 in step 310. The set of candidate 1-itemsets is simply all possible 1-items.

In step 320, the supports of the k-itemsets are counted. This is a key step which requires careful data sharing among the different entities. The details of this step are described below in the context of FIG. 4. Once the counts for the various itemsets have been determined, these counts are transmitted across the different entities (e.g., servers 150). These counts are utilized for the purpose of determining the frequent k-itemsets.

In step 330, a join is performed on the set of k-itemsets in order to generate the set of (k+1)-candidates. In step 340, k is incremented by one. If the set of (k+1)-candidates is empty, as checked in step 350, then the process terminates (block 360). Otherwise, the process returns to step 320 in order to generate the next set of k-itemsets. We now describe how to count the support of k-itemsets.

Figure 4:
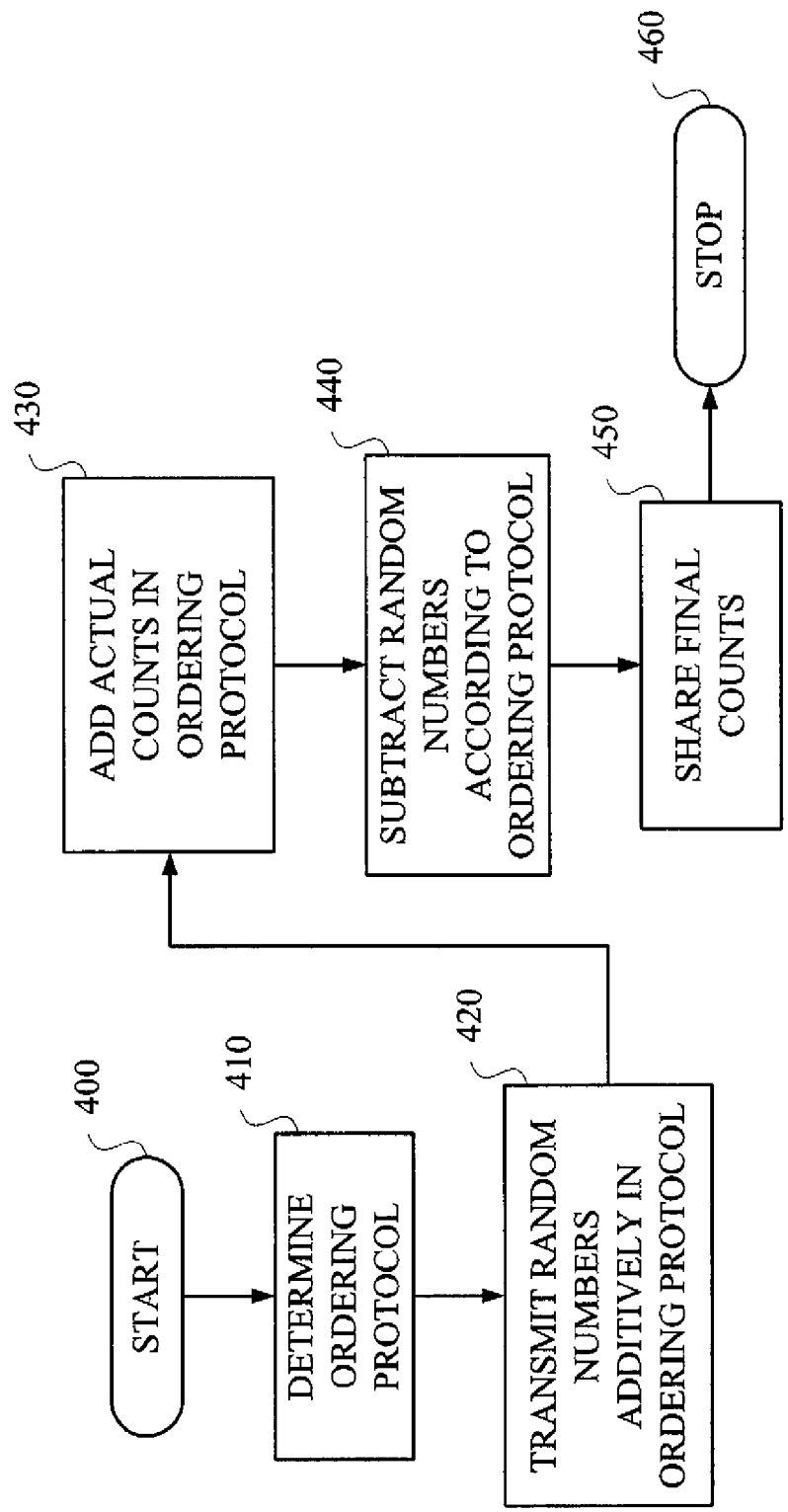
FIG. 4 is a flow diagram illustrating a procedure for computing counts of itemsets, according to an embodiment of the present invention.

Referring now to FIG. 4, a flow diagram illustrates a procedure for computing counts of itemsets, according to an embodiment of the present invention. It is to be understood that FIG. 4 illustrates one embodiment of step 320 (FIG. 3).

In order to illustrate this step, we will describe the process of counting the support of a single k-itemset. Since entities are not even willing to provide the counts for the individual itemsets, it requires an ordering protocol among the different entities. In order to illustrate our point, we will use the example of FIG. 1. As shown in FIG. 4, after start block 400, the first step is to create an ordering among the different entities. This is achieved in step 410. This ordering is utilized for the purpose of transmitting the itemset counts among the different entities. Consider, for example, the case when the counts at entities 1, 2, 3, 4 and 5 (FIG. 1) are 3, 7, 5, 8 and 11, respectively. The first step from each entity is to generate a random number independently.

The value that each entity passes to another entity may be considered a "global count." That is, each entity adds to or subtracts from the global count, as will be illustrated in the example below.

Let us say that the random numbers generated are 2, 5, 11, 3 and 6, respectively. In the first round, the entities pass around the random numbers additively. Thus, entity 1 passes the number 2 to entity 2 (e.g., the global count is initially zero to which entity 1 adds the number 2), then entity 2 passes the number 2+5 to entity 3, then entity 3 passes the number 2+5+11 to entity 4, entity 4 passes the number 2+5+11+3 to entity 5, and entity 5 passes the number 2+5+11+3+6=27 back to entity 1. Thus, in step 420, the random numbers are additively passed around without divulging the exact perturbations.

In the next round, each entity adds his own true itemset count to the overall count of 27 (step 430). Thus, entity 1 passes the number 27+3 to entity 2, entity 2 passes 27+3+7 to entity 3, entity 3 passes 27+3+7+5 to entity 4, entity 4 passes 27+3+5+8 to entity 5, and entity 5 passes 27+3+7+5+8+11 (27+34) to entity 1. Thus, entity 1 now has both the random number count (27) as well as aggregate count (27+34). From this, the entity can deduce that the true itemset count is 34, and propagate this to the rest of the group.

However, for reasons that will soon become apparent, the process uses a third step in order to calculate the actual counts. In the third step, each entity subtracts his random number before transmitting to the next member in the group. Thus, entity 1 transmits 27+34-2 to entity 2, entity 2 transmits 27+34-2-5 to entity 3, and so on until entity 5 transmits 27+34-27 to entity 1. This is accomplished in step 440. Final counts are shared in step 450. The process ends at block 460.

One reason for performing this 3-layered approach is that the entities now need not necessarily use any particular ordering among the three layers. Thus, for example, an entity may choose to add his true count in the first round, subtract the random number in the second round and add in the third. The overall result is still the same irrespective of what ordering an entity chooses. However, this results in a greater level of privacy for all the remaining entities since partial counts are not known at intermediate stages. This also provides a greater level of privacy in the event of a leak of one or more of the transmissions among different entities.

In many cases, it is also possible to share the information among the different entities when different entities carry information about different sets of items. This is quite likely in most real situations. For example, in a superstore, not all items may be stored by all customers. This situation can be effectively handled by using an approach in which each entity only sends the count for the itemset to the next entity which subscribes to all such items. This is illustrated in FIG. 5.

Figure 5:
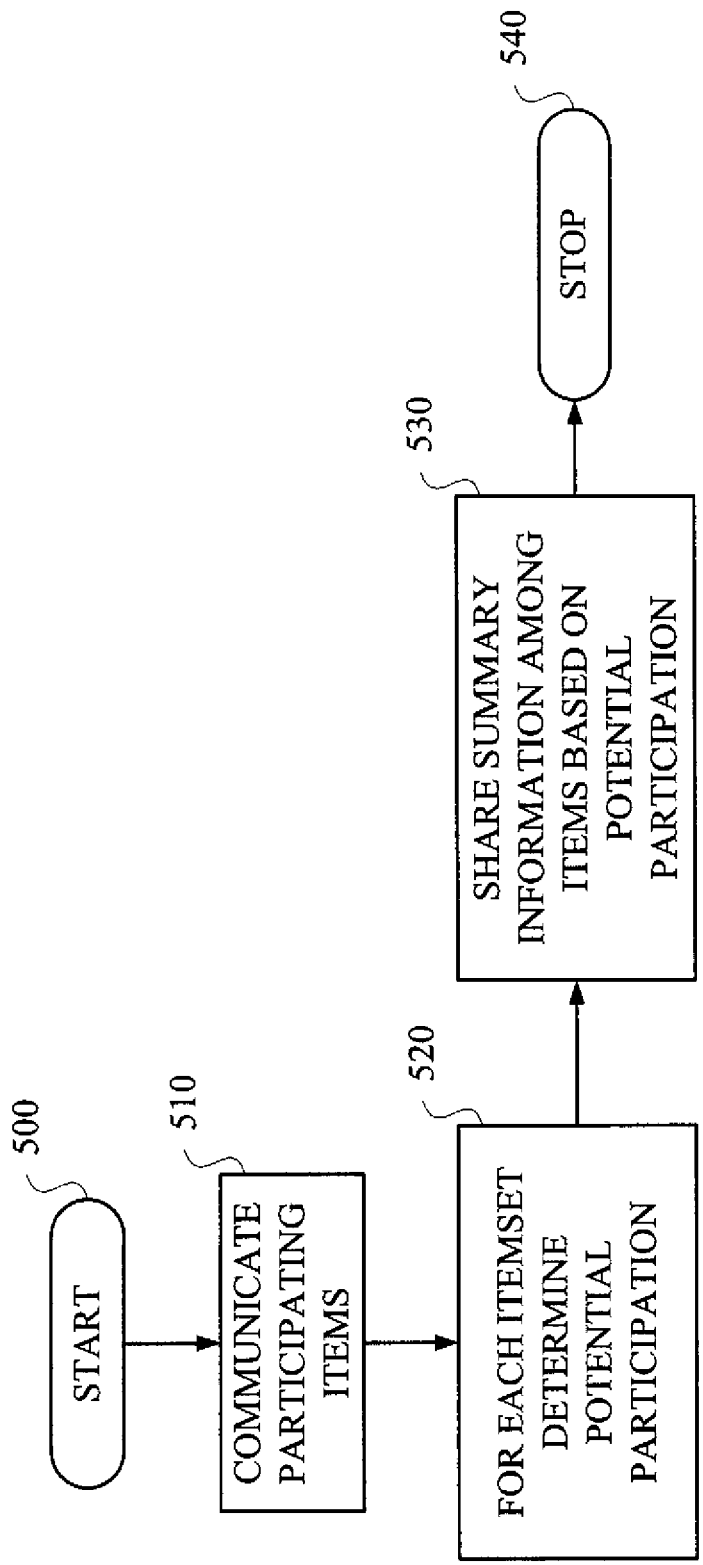
FIG. 5 is a flow diagram illustrating a procedure when a limited set of items is utilized for itemset mining process, according to one embodiment of the present invention.

Referring now to FIG. 5, a flow diagram illustrates a procedure when a limited set of items is utilized for itemset mining process, according to one embodiment of the present invention. The process starts at block 500. In step 510, each entity specifies the set of items that they are providing data about. The entities share this information freely among one another. Once this information is shared, it is easy for the entities to determine the relevant entities for each itemset.

An entity is considered relevant for an itemset if and only if it shares information pertaining to all possible items in it. This is referred to as potential participation in step 520. The basic algorithm for sharing summary statistics remains the same among different entities. The only difference is that an entity only transmits the count for an itemset to the next potential participant in the designated ordering. In addition, the global counts for those itemsets with too few potential participants are not determined and the itemsets may be discarded (what comprises too few potential participants, e.g., 0, 1, 2, ..., etc., may be decided based on the user support threshold and, in any case, such number is application-dependent). This is necessary in order to provide a greater level of robustness during the information sharing process. This step ensures that each entity receives global information about those items that it participates in.

In step 530, summary information is shared among items based on potential participation. The process ends at block 540.

We note that the method can be easily extended to the case in which it is desirable to find association rules instead of itemsets. That is, in a customer transaction database, a typical goal is to find correlations among items. For example, in a supermarket, it is often the case that people who buy milk also buy butter. Therefore, an example of an association rule is: Milk→Butter. Thus, an association rule may be defined as a set relationship of the form: $S_1 \rightarrow S_2$, where $S_1$ and $S_2$ are two sets of items. The strength of the association rule is defined by measures such as support, as described above.

In this case, the process shares data about the strength of the potential rules instead of itemsets. Once the itemsets have been generated, the process determines all possible potential rules. As in the previous case, the process exchanges information about the counts of transactions satisfying each rule. The same data exchange procedure with randomization (as discussed in FIG. 4) is used.

This procedure also ensures that the data about individual entities is not known on a global basis.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of data mining in a privacy-preserving manner in a distributed computing environment including a plurality of entities, comprising the steps of:
   a first entity of the plurality of entities exchanging summary information with a second entity of the plurality of entities via a privacy-preserving data sharing protocol such that the privacy of the summary information is preserved, the summary information associated with an entity relating to data stored at the entity; and the first entity mining data based on at least the summary information obtained from the second entity via the privacy-preserving data sharing protocol;
   wherein the summary information exchanging step comprises:
   the first and second entities each generating a random number;
   in a first round, the first entity and the second entity adding their random numbers to a global count, in a given order, to generate an overall global count, wherein a current count value that an entity receives from a previous entity in the given order is the global count; and
   in a second round, the first entity and second entity adding a first value and a second value, respectively, to the overall global count, in the given order, the first and second values representing private data of the first and second entities.

2. The method of claim 1, wherein the summary information exchanging step further comprises the first entity obtaining, from the second entity via the privacy-preserving data sharing protocol, information relating to the number of transactions in which a particular itemset occurs.

3. The method of claim 1, wherein the summary information exchanging step further comprises the first entity obtaining, from the second entity via the privacy-preserving data sharing protocol, information relating to the number of transactions in which a particular rule is satisfied.

4. The method of claim 1, wherein the summary information exchanging step further comprises the first entity subtracting the random number from the global count and transmitting the global count to the second entity.

5. The method of claim 1, wherein the summary information exchanging step further comprises the first entity exchanging summary information with two or more of the plurality of entities and the first entity mining data based on the summary information obtained from the two or more entities.

6. The method of claim 5, wherein the summary information exchanging step further comprises the first entity exchanging summary information with the two or more entities, wherein the summary information relates to a limited subset of items.

7. The method of claim 6, wherein the summary information exchanging step further comprises the first entity defining the limited subset of items for which summary information is to be exchanged.

8. The method of claim 7, wherein the summary information exchanging step further comprises the first entity determining participating entities for each itemset for which summary information is to be exchanged.

9. The method of claim 8, wherein the summary information exchanging step further comprises the first entity transmitting summary information only to a participating entity for a particular itemset.

10. The method of claim 1, further comprising the step of the first entity discarding itemsets having a number of potential participants below a particular threshold value.

11. The method of claim 1, further comprising the step of the first entity generating one or more association rules from one or more itemsets.

12. Apparatus associated with a first entity in a distributed computing environment, including a plurality of entities, for data mining in a privacy-preserving manner, comprising:
   a memory; and
   at least one processor coupled to the memory and operative to: (i) exchange summary information with a second entity of the plurality of entities via a privacy-preserving data sharing protocol such that the privacy of the summary information is preserved, the summary information associated with an entity relating to data stored at the entity; and (ii) mine data based on at least the summary information obtained from the second entity via the privacy-preserving data sharing protocol;
   wherein the summary information exchanging operation comprises:
   generating a random number by the first entity;

in a first round, the first entity adding its random number to a global count and transmitting the global count to the second entity, and the second entity adding a second random number to the global count, wherein the first and second entities add their random numbers to the global count, in a given order, to generate an overall global count, wherein a current count value that an entity receives from a previous entity in the given order is the global count; and in a second round, the first entity and second entity adding a first value and a second value, respectively, to the overall global count, in the given order, the first and second values representing private data of the first and second entities.

13. The apparatus of claim 12, wherein the summary information exchanging operation further comprises obtaining, from the second entity via the privacy-preserving data sharing protocol, information relating to the number of transactions in which a particular itemset occurs.

14. The apparatus of claim 12, wherein the summary information exchanging operation further comprises obtaining, from the second entity via the privacy-preserving data sharing protocol, information relating to the number of transactions in which a particular rule is satisfied.

15. The apparatus of claim 12, wherein the summary information exchanging operation further comprises subtracting the random number from the global count and transmitting the global count to the second entity.

16. The apparatus of claim 12, wherein the summary information exchanging operation further comprises exchanging summary information with two or more of the plurality of entities and mining data based on the summary information obtained from the two or more entities.

17. An article of manufacture for use with a first entity in a distributed computing environment, including a plurality of entities, the article of manufacture comprising one or more programs which when executed by a computer, implement a method for data mining in a privacy-preserving manner comprising the steps of:

the first entity exchanging summary information with a second entity of the plurality of entities via a privacy-preserving data sharing protocol such that the privacy of the summary information is preserved, the summary information associated with an entity relating to data stored at the entity; and the first entity mining data based on at least the summary information obtained from the second entity via the privacy-preserving data sharing protocol;

wherein the summary information exchanging step comprises:

the first and second entities each generating a random number;

in a first round, the first entity and the second entity adding their random numbers to a global count, in a given order, to generate an overall global count, wherein a current count value that an entity receives from a previous entity in the given order is the global count; and in a second round, the first entity and second entity adding a first value and a second value, respectively, to the overall global count, in the given order, the first and second values representing private data of the first and second entities.

* * * * *